(No Model.)

T. B. WILLIAMS.
ICE TIRE FOR VEHICLE WHEELS.

No. 334,322. Patented Jan. 12, 1886.

WITNESSES
Percy C. Bowen
N. Bernhard

INVENTOR
Thomas B. Williams,
By C. A. Snow & Co.
his Attorneys.

UNITED STATES PATENT OFFICE.

THOMAS B. WILLIAMS, OF ORANGE, MASSACHUSETTS.

ICE-TIRE FOR VEHICLE-WHEELS.

SPECIFICATION forming part of Letters Patent No. 334,322, dated January 12, 1886.

Application filed August 27, 1885. Serial No. 175,476. (No model.)

*To all whom it may concern:*

Be it known that I, THOMAS B. WILLIAMS, a citizen of the United States, residing at Orange, in the county of Franklin and State of Massachusetts, have invented a new and useful Improvement in Ice-Tires for Vehicle-Wheels, of which the following is a specification, reference being had to the accompanying drawings.

My invention has relation to improvements in ice-tires, especially adapted for use upon the tires of bicycles, tricycles, and vehicles of any description; and the novelty consists in the peculiar construction and combination of parts, substantially as hereinafter fully set forth, and particularly pointed out in the claims.

The object of my invention is to provide a device of the character named which can be readily applied to and removed from the tire of a bicycle, tricycle, or other like vehicle, to enable the same to travel or move upon ice, snow, or other slippery surfaces with safety to the rider and non-liability to slip thereon, which shall be thoroughly effective in operation, which shall be cheap of manufacture, and can be kept in stock and retailed to suit the requirements of bicyclists and the like, which can be folded up to adapt the device to be easily carried about, and which can be fitted and adjusted by unskilled persons.

Figure 1:
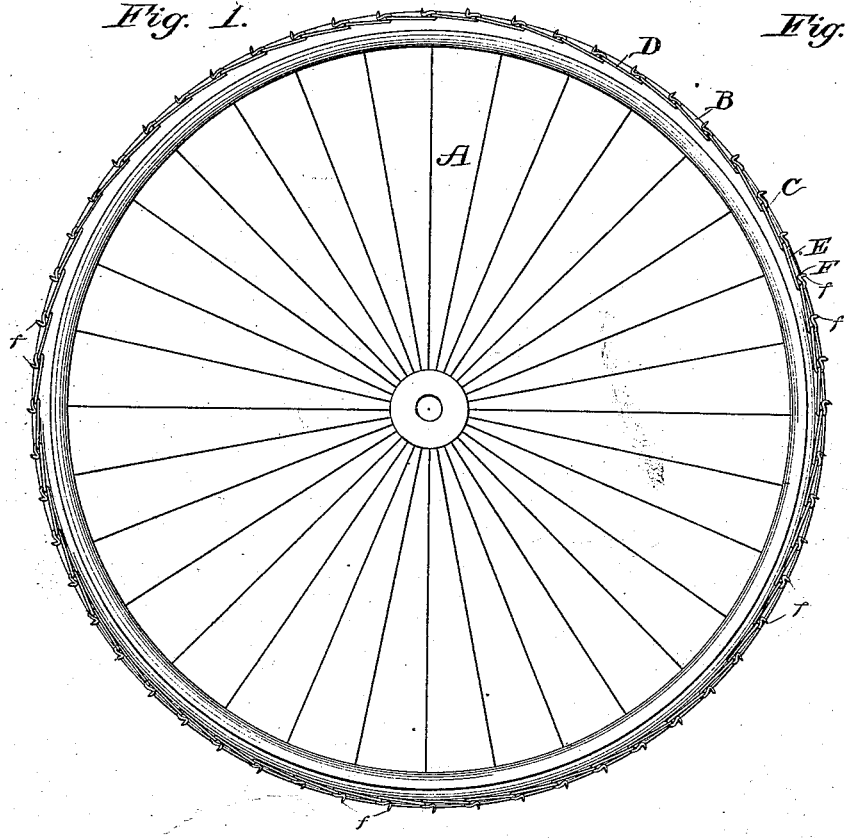
Figure 2:
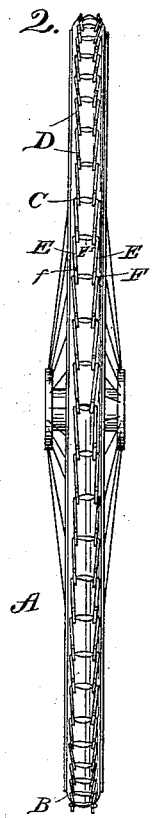
Figure 3:
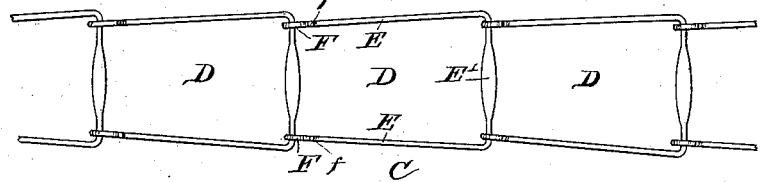
Figure 4:
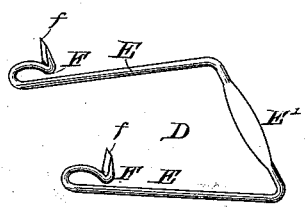

I have shown an embodiment of my invention in the accompanying drawings, in which Figure 1 is a side elevation of a wheel having my improvement applied thereto. Fig. 2 is an end elevation. Fig. 3 is an enlarged detail view of a section of the tire, and Fig. 4 is an enlarged detail perspective view of one of the links.

Like letters of reference in the several figures of the drawings denote corresponding parts.

Referring by letter to the drawings, A designates a wheel of any preferred or ordinary construction, which in the present instance is of the bicycle or tricycle class, and having a rubber tire, B.

C designates my improved tire, fitted around the rubber tire of the wheel, and comprising a series of links, D, constructed as presently described, and pivotally connected together, as will more fully appear.

Each link D comprises two side bars, E, connected at one end by a cross-bar, E', and having their opposite ends bent upon themselves for a short distance, as at F, the extreme inner free ends of which are bent outwardly to provide teeth or prongs *f*, which are preferably pointed or sharpened to enable them to readily enter the ice. The link is made from one rod or piece of wire, iron, &c., and is bent to form or provide the bars and hooks above described. The hooks or bent portions of the side bars of one link engage the cross-bars of the adjacent link, said side bars being bent inwardly to a slight degree to enable the said hooked or bent portions to fit snugly against or in the angle formed by the side and cross bars of said links, thus pivotally connecting said links together. The tire is thus made up of a series of these links to the required length to fit the circumference of the wheel, and the links thereof are of such a width that they fit on the side edges of such rubber or elastic tire of the vehicle-wheel, leaving the outer periphery thereof projecting above the plane of the side bars.

As is well known, the tires of bicycles, tricycles and the like are made round or circular in cross-section, and to tires of this class the present invention is especially adapted, snugly and closely fitting the same, as above described, and having the teeth or prongs *f* projecting beyond the said rubber tire at each side of the link, whereby the wheel is supported on the slippery or iced surfaces by the teeth catching or taking therein.

To apply my improved tire, it is only necessary to obtain a sufficient number of links, which may be kept in stock and retailed like other articles of bicyclists' supplies, or they may be connected together to provide a tire of sufficient length, and fit the links around the outer circumference of the elastic tire of a bicycle or other like vehicle, so as to leave the teeth or prongs projecting outwardly and the side bars thereof below the plane of the rubber tire at the ends, where the hooks F are bent around the cross-bar of the adjacent link, and then bring the two ends together and connect the links, as above described.

It will be observed that my improved tire can be easily, readily, and quickly applied to a vehicle-wheel and removed therefrom, is extremely simple, strong, and durable in construction, thoroughly effective and positive in action, can be manufactured and supplied at a minimum of cost, and be applied by unskilled persons.

By reason of the links being pivotally connected to provide a flexible tire they take into or bear against the elastic tire snugly and tightly, and prevent the vehicle-wheel from slipping or moving therein when strain is exerted thereon, due to the resistance of the prongs in entering the ice when the rider is mounted on the machine and driving the same.

The prongs of each link are in the same transverse plane or line with each other, and the hooks are bent rearwardly and outwardly until they bear or abut against the side bars of the links, whereby the machine-wheel tire is given two supporting prongs or teeth to every link, which enter and leave the ice simultaneously, and by reason of the hooks bearing on the side bars the strain or force exerted on them is taken up in part by the said side bars, thus materially strengthening the hooks and rendering them less liable to become broken or twisted out of their proper places. When one of the links shall have become broken, it is very easy to detach it from the tire by simply disengaging the hooks and replacing it with a new link.

Various changes in the form and proportion of parts and details of construction and manufacture can be made without departing from the principle or sacrificing the advantages of my invention, the essential features of which will be readily understood from the foregoing description, taken in connection with the drawings.

Having thus fully described my invention, what I claim as new, and desire to secure by Letters Patent of the United States, is—

1. The combination, with a bicycle-wheel tire, of a flexible supplementary tire comprising a series of pivotal links having prongs at its bent ends projecting beyond the wheel-tire, and the side bars of said links being located on opposite sides of the wheel-tire below the plane of the outer surface of its periphery, substantially as described.

2. As a new article of manufacture, a flexible ice-tire adapted to be removably secured or fitted to the elastic tires of vehicles, and comprising a series of links pivotally connected together, and each link having hooked ends and teeth or prongs $f$ projecting beyond the vertical face of the wheel-tire and on each side thereof, substantially as described.

3. As an article of manufacture, a wheel-tire adapted to be removably connected to the elastic tires of bicycles, comprising a series of links flexibly connected together, the side bars of each link being bent around the cross-bar of the adjacent link and upon itself, to provide outwardly-projecting prongs, which extend beyond the periphery of the elastic tire to which it is secured, substantially as described.

In testimony that I claim the foregoing as my own I have hereto affixed my signature in presence of two witnesses.

THOMAS B. WILLIAMS.

Witnesses:
W. E. OSTERHOUT,
R. D. CHASE.